(12) United States Patent
Low et al.

(10) Patent No.: US 8,059,592 B2
(45) Date of Patent: Nov. 15, 2011

(54) ACCESS TERMINAL WHICH HANDLES MULTIPLE USER CONNECTIONS

(75) Inventors: Su-Lin Low, San Diego, CA (US); Hausting Hong, San Diego, CA (US); Gene Wesley Marsh, Del Mar, CA (US); Satyaprasad Srinivas, San Diego, CA (US)

(73) Assignee: VIA Telecom Co., Ltd., George Town (KY)

( * ) Notice: Subject to any disclaimer, the term of this patent is extended or adjusted under 35 U.S.C. 154(b) by 1081 days.

(21) Appl. No.: 11/748,042

(22) Filed: May 14, 2007
(Under 37 CFR 1.47)

(65) Prior Publication Data
US 2008/0285508 A1 Nov. 20, 2008

(51) Int. Cl.
*H04W 72/04* (2009.01)
(52) U.S. Cl. .............................. 370/329; 370/462
(58) Field of Classification Search .................. 370/328, 370/329, 335, 352, 462; 455/452.1, 452.2, 455/435.3
See application file for complete search history.

(56) References Cited

U.S. PATENT DOCUMENTS

| | | | |
|---|---|---|---|
| 7,058,031 B2 | 6/2006 | Bender et al. | |
| 2003/0023743 A1* | 1/2003 | Raphel et al. | 709/232 |
| 2005/0041640 A1* | 2/2005 | Nasielski et al. | 370/352 |
| 2007/0201437 A1* | 8/2007 | Kim et al. | 370/352 |
| 2008/0026724 A1* | 1/2008 | Zhang | 455/411 |
| 2008/0045215 A1* | 2/2008 | Chen et al. | 455/435.2 |
| 2008/0049616 A1* | 2/2008 | Kamath et al. | 370/235 |
| 2008/0222707 A1* | 9/2008 | Pathuri et al. | 726/4 |
| 2008/0250419 A1* | 10/2008 | Kasten et al. | 718/104 |

FOREIGN PATENT DOCUMENTS

CN 1777301 5/2006

OTHER PUBLICATIONS

"1xEV: 1x Evolution IS-856 TIA/EIA Standard" *Airlink Overview.* QUALCOMM, Inc. Nov. 7, 2001 Revision 7.2. pp. 1-27.

* cited by examiner

*Primary Examiner* — Kamran Afshar
*Assistant Examiner* — Khawar Iqbal
(74) *Attorney, Agent, or Firm* — James W. Huffman

(57) ABSTRACT

System and method for handling multiple connection requests between an Access Terminal (AT) and an Access Network (AN). The method may include receiving a first connection request. Connection request information regarding a number of connection requests may be updated based on receiving the first connection request. If there is not a currently active wireless connection, a connection may be established between the AT and the AN. If there is a currently active wireless connection, a notification may be sent indicating that the wireless connection between the AT and the AN has been established. A connection release request may be received. Accordingly, the update connection request information may be updated based on receiving the connection release request. If there is not a currently active wireless connection, the wireless connection between the AT and the AN may be closed.

14 Claims, 14 Drawing Sheets

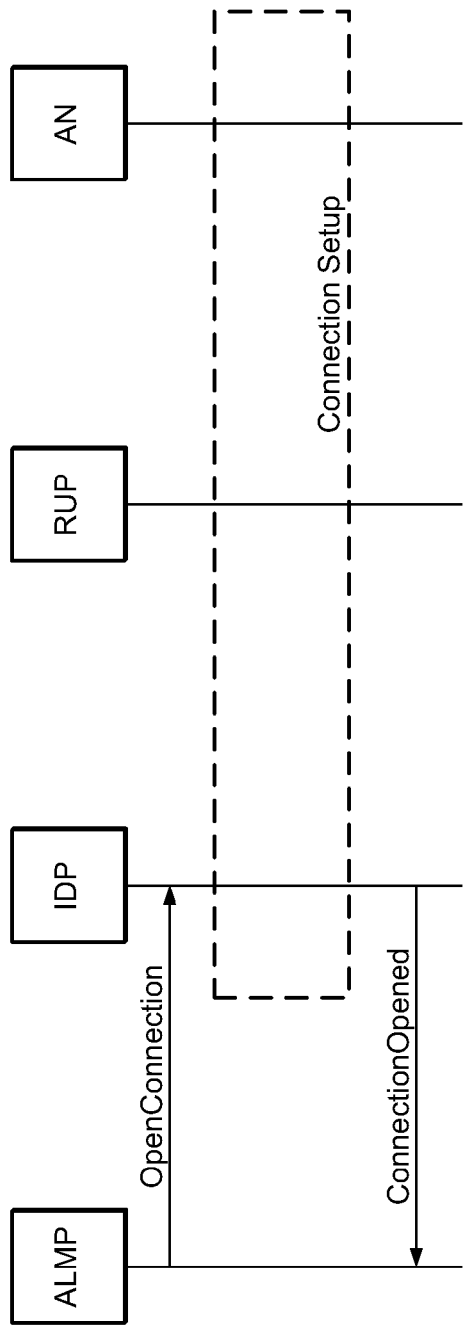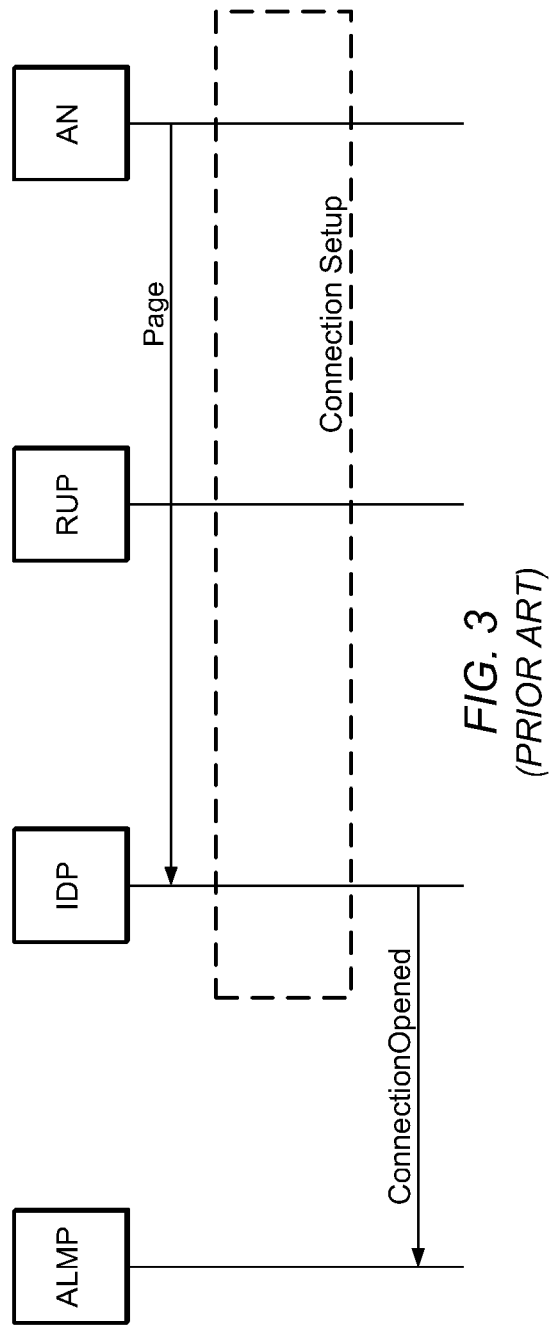
FIG. 2
(PRIOR ART)
FIG. 3
(PRIOR ART)

ACCESS TERMINAL WHICH HANDLES MULTIPLE USER CONNECTIONS

FIELD OF THE INVENTION

The present invention relates generally to communication protocols and particularly to the handling of multiple connection requests from different user applications.

DESCRIPTION OF THE RELATED ART

In recent years there has been a proliferation of packet based communications. For example, a large amount of this network traffic comes from user applications. Correspondingly, multiple traffic controllers and protocols have been developed to handle application communications. For example, the 1xHRPD (High Rate Packet Data) system provides connection control and maintenance for Access Terminals (ATs) using various connection layer protocols, e.g., the Air Link Management Protocol (ALMP), Idle State Protocol (IDP), Route Update Protocol (RUP), and Connection State Protocol (CSP). These protocols may specify procedures for AT-initiated or Access Network (AN)-initiated connection setup and closing, through state machine transitions, messaging, command handling, and procedure descriptions.

For example, FIG. 1 is a diagram illustrating an existing traffic connection setup call flow. More specifically, FIG. 1 illustrates the traffic connection setup call flow between the AT's connection layer and the AN. FIG. 2 illustrates an AT-initiated connection setup call flow between the AT's connection layer and the AN. FIG. 3 illustrates an AN-initiated traffic connection setup call flow between the AT's connection layer and the AN. FIG. 4 illustrates a fast AT-initiated traffic connection setup call flow between the AT's connection layer and the AN. Note that this setup may be similar to the traffic connection setup shown in FIG. 1 except that the fast AT-initiated traffic connection setup may not include a connection request and route update message. FIG. 5 illustrates an AT-initiated and AN-initiated traffic connection close call flow between the AT's connection layer and the AN.

The existing procedures and messaging currently are not able to handle multiple connection requests from multiple user applications. In some cases, only one user application may open and use a connection at any given time. Currently, when additional user requests for opening a connection arrive while a traffic connection setup is in progress, the additional user requests will be ignored/dropped, leading to a connection setup failure for additional users. Additionally, if a traffic channel connection was first opened by the packet call manager (PCM) for a packet call, and if the packet call goes to a dormant mode, then a traffic connection is setup from another user application. In this case, the packet call cannot be reactivated and the packet call will be released. Thus, improvements in existing traffic connection setup processes are desired.

SUMMARY OF THE INVENTION

Various embodiments of a method for handling multiple connection requests from different applications are presented herein.

A first connection request may be received. In some embodiments, the request may be received by an Access Terminal (AT). For example, the first connection request may be transmitted by a first application executing on the AT. As a more specific example, a user of the AT may be executing an application, e.g., for web browsing, email client, on-line games, voice over IP (VoIP), file transfer protocol (ftp), secure shell (ssh) protocol, and/or other protocols or applications such as testing applications. Alternatively, the first connection request may be transmitted by an Access Network (AN). For example, such an action may occur if the user is using a cell phone and receives a call.

A first connection (e.g., a first wireless connection) may be established between the AT and the AN. Establishing the connection may be performed in response to receiving the first connection request. Establishing the connection may be performed according to ordinary procedures including, for example, communicating handshake information, identification information, communication information, and/or other information required for establishing a connection (e.g., a wireless connection).

Additionally, information may be stored indicating that the first connection is being set up prior to establishing the first connection, and second information may be stored indicating the first connection is established after establishing the first connection. As one example, storing the first information and the second information may involve setting a flag (e.g., a connection-setup-in-progress flag) to a value (e.g., on or true) indicating that the first connection is being established and then setting the flag to a value (e.g., off or false) indicating the first connection has been established. Note that this flag is exemplary only and that other information indicating the beginning or ending of the connection setup is contemplated. Thus, a first connection between the AT and the AN may be established. The first connection may then be used by the AT (e.g., the first application executing on the AT) and/or the AN.

Connection request information regarding a number of connection requests may be updated. Updating the connection request information may be performed in response to receiving the first connection request. The connection request information may be any type of information used to keep track of the number of connection requests (or possibly the number of active applications using the connection). In primary embodiments, the connection request information may include a counter which increments when a new connection request is received or when a new application begins using the connection. As one example, where there is not a currently active connection, the counter may go from a first value (e.g., 0) to a second value (e.g., 1) based on receiving the first connection request. Thus, when the first connection request is received, the connection request information may be updated to reflect that connection request. Updating the connection request information may be performed by the AT. However, it should be noted that other components or devices may maintain and update the connection request information as desired (e.g., the AN).

A second connection request may be received, e.g., by the AT. Similar to descriptions above regarding the first connection request, the second connection request may be transmitted from a second application executing on the AT or may be received from the AN, among other sources. Note that if the connection is still being established, the second connection request may be queued. Checking to see if the connection is still being established may be performed by checking the connection-setup-in-progress flag (or other similar information) described above.

It may be determined if there is a currently active connection between the AT and the AN. Similar to above, the determination may be performed by the AT and/or other devices or components as desired. If there is a currently active connection between the AT and the AN, a response or notification may be send which indicates that the first connection between the AT and the AN has been established. In various embodiments, the notification may be sent to the AN and/or the second application (among others). The notification may be sent to the transmitter of the second connection request. Additionally, where there is an already established connection (e.g., the first connection from above), the second application and/or the AN may use the first connection for communication. Thus, in one embodiment, a plurality of applications may use the first connection to communicate with a network (e.g., the Internet).

If there is not a currently active connection, a connection may be established as described above. The AT (e.g., executing the second application) and/or the AN may then use the newly established connection for communication.

The connection request information may be updated. Similar to above, the connection request information may be updated before or after the determination of 710 and may be performed by the AT (or other devise or component) as desired. As also indicated above, updating the connection request information may include incrementing a counter of requests or active applications. Following the example from above, assuming the existing connection is still active and no connection release request has been received, the counter may increase from the second value (e.g., 1) to a third value (e.g., 2).

A connection release request may be received, e.g., by the AT. In various embodiments, the connection release request may be sent by the AN, the first application, the second application, the AT, and/or other sources, as desired.

The connection request information may be updated in response to the connection release request. As indicated above, the connection request information may be stored and updated by the AT or other device as desired. For example, where the connection request information includes a counter, the counter may be decremented. Following the specific example from above, the counter may be decremented from a first value (e.g., 2) to a second value (e.g., 1).

It may be determined if there should be a currently active connection after receiving the connection release request. Similar to above, the determination may be performed by the AT or other component or device as desired. Determining if there should be a currently active connection may involve use of the connection request information. For example, if the connection request information indicates that there is an application (or other process) still using the connection, the connection may be maintained (e.g., not closed). This may be easily determined in situations where the connection information includes a counter. Following the examples from above, the counter may have been decreased from 2 to 1 after receiving the connection release request. Because the counter is greater than 0, it can be inferred that an application or other process is still using the connection. Correspondingly, the connection release request may not result in releasing the connection, but may instead only change the connection request information.

If there is not a currently active connection (other than the one being requested to be released), the connection between the AT and the AN may be closed. For example, following the counter embodiment from above, if the value is 0 (or possibly below 0) after updating the counter based on the release request, then the connection should be closed. Thus, a connection release request may or may not result in a closure of the connection, depending on the connection request information.

As noted above, this method may particularly apply to the EV-DO, EV, CDMA, and/or other wireless communication standards and protocols. In one embodiment, the AT and the AN may communicate and/or determine connection information using the Air Link Management Protocol (ALMP), the Idle State Protocol (IDP), the Route Update Protocol (RUP), and/or the Connected State Protocol (CSP).

Thus, the method may include centralizing connection control at the Air Link Management Protocol (ALMP) and using a connection request counter to keep track of the number of connections opened. Other protocols may remain transparent. In other words, modifications to other protocols may not be necessary.

BRIEF DESCRIPTION OF THE DRAWINGS

The foregoing, as well as other objects, features, and advantages of this invention may be more completely understood by reference to the following detailed description when read together with the accompanying drawings in which:

FIGS. 1-5 are prior art diagrams illustrating various wireless connection procedures;

Figure 1:
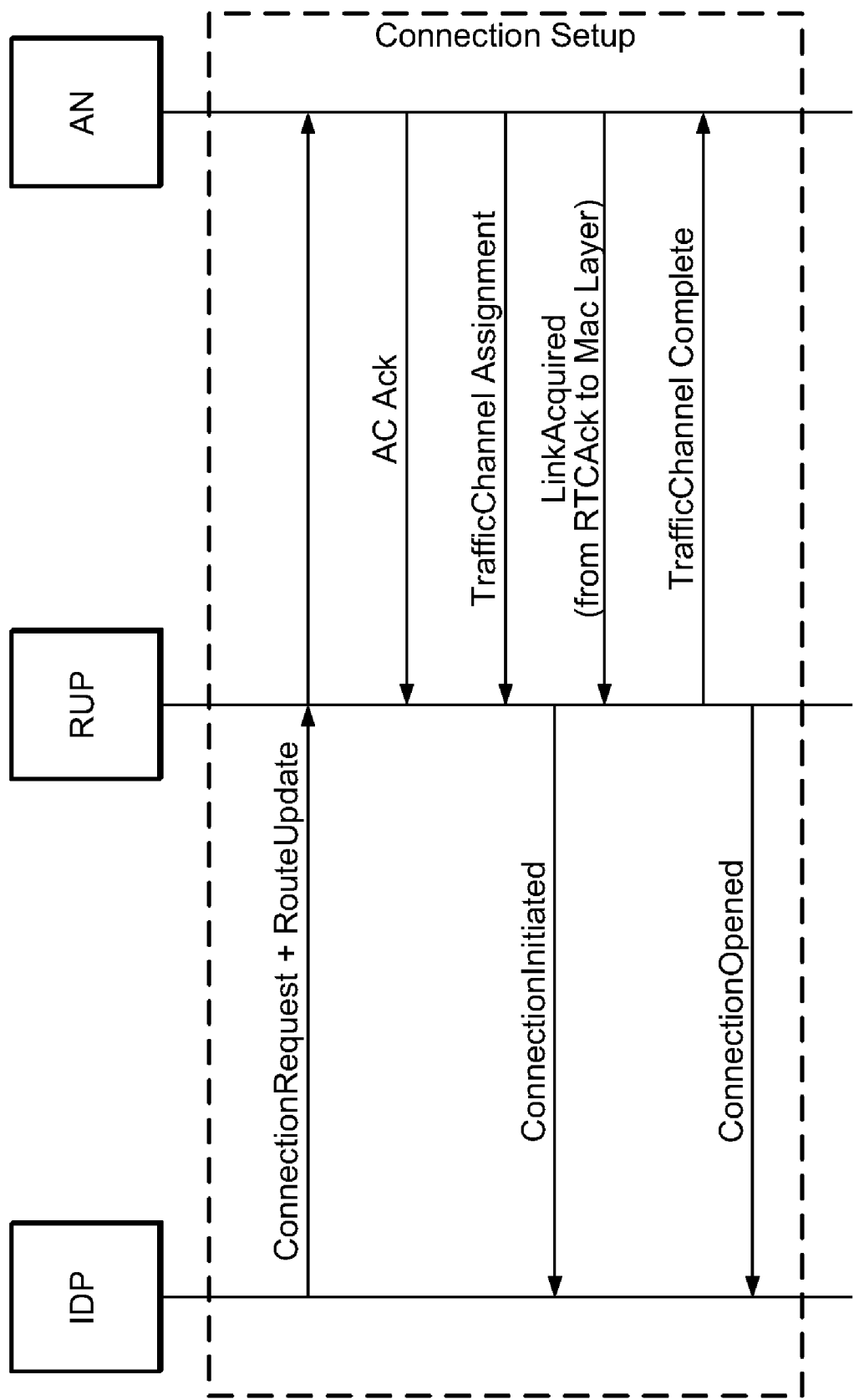
Figure 4:
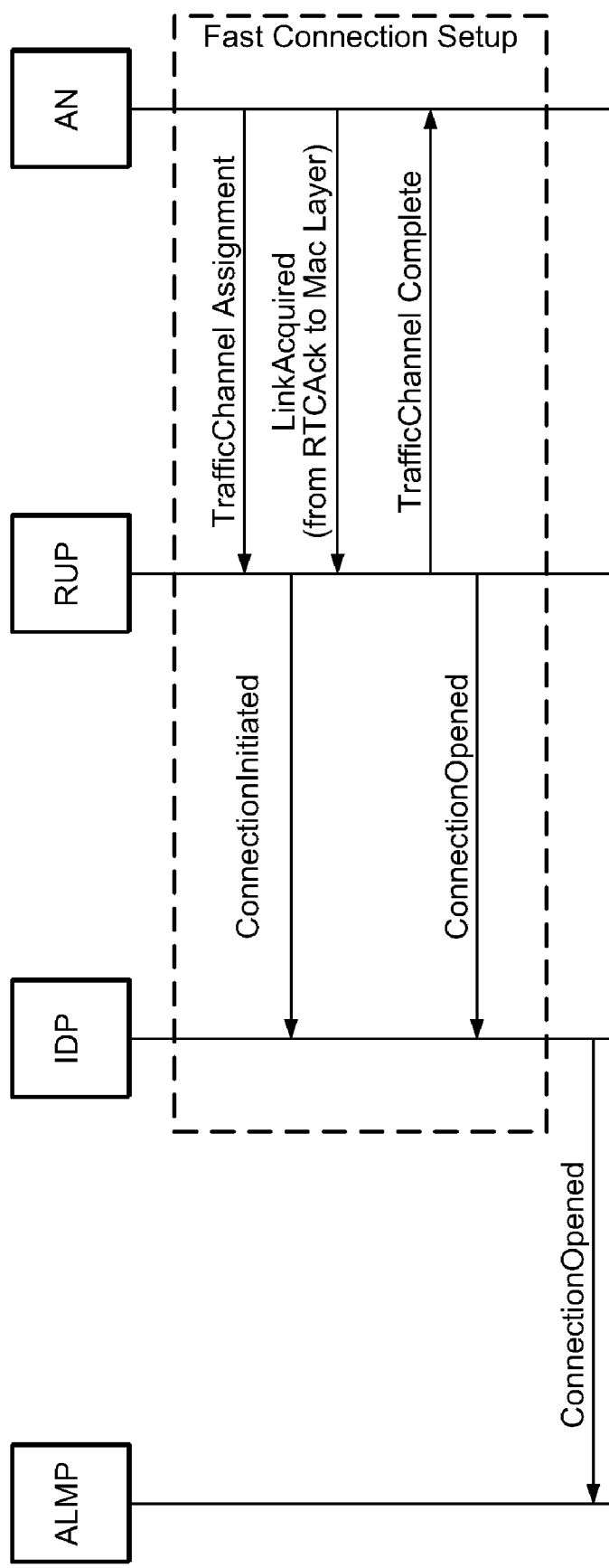
Figure 5:
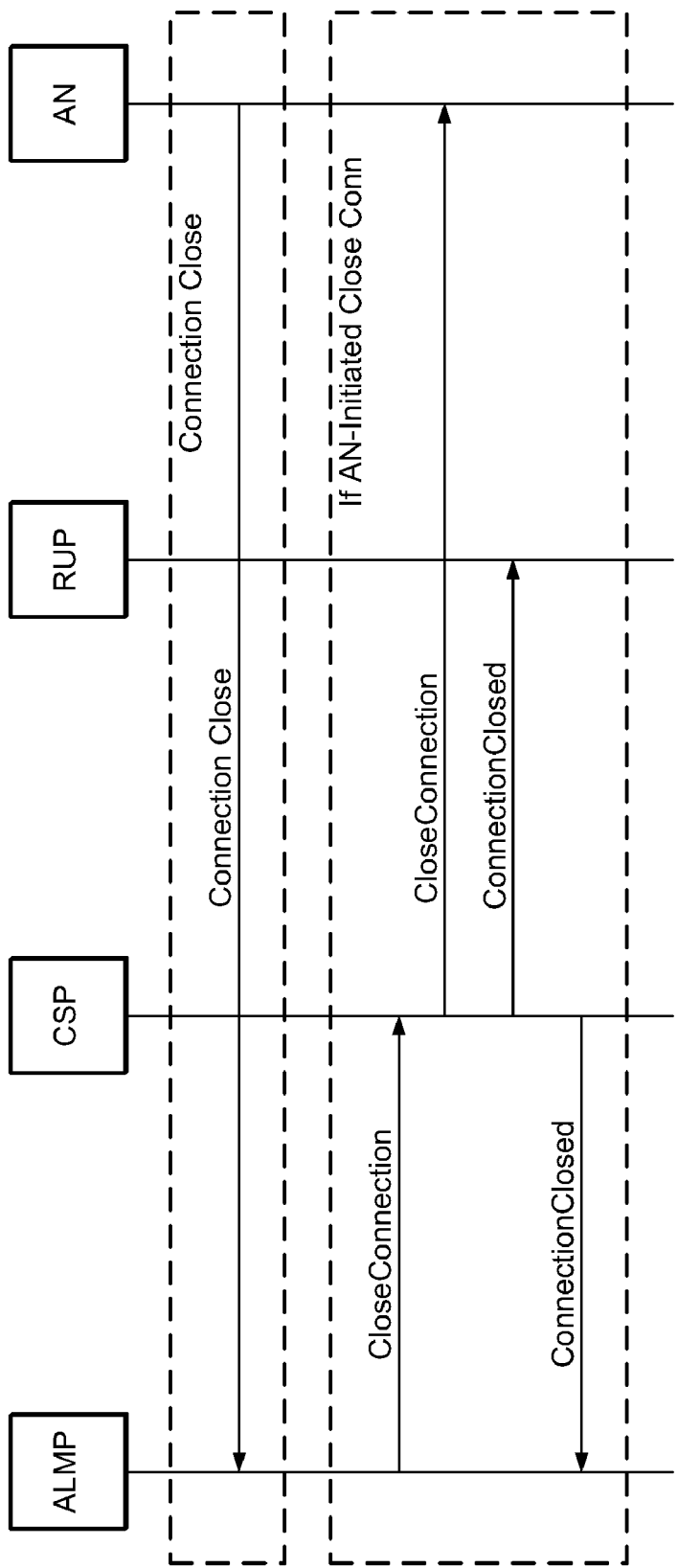

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE EMBODIMENTS

Various embodiments of a method for handling multiple connection requests from different applications are presented herein.

Figure 6:
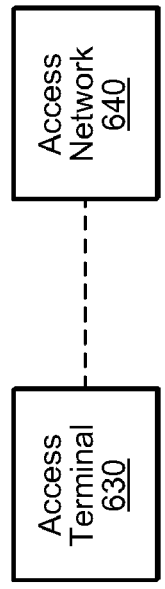
FIG. 6 is a block diagram of an exemplary wireless communications system according to one embodiment.

FIG. 6—Exemplary Wireless Communications System

FIG. 6 illustrates an exemplary wireless communications system operable to implement various embodiments of the present invention. As shown, the system may include an Access Terminal 630. The Access Terminal (AT) 630 may be coupled to an Access Network (AN) 640. Note that the AT 630 may be coupled to the AN in a wired or wireless fashion, as desired. However, in primary embodiments, the AT 630 may communicate with the AN 640 wirelessly. The AN 640 may couple to a wide area network, such as the Internet.

The AT 630 may be a wireless device (or plurality of devices) that provides data connectivity to the AN 640 for a user. For example, the AT 630 may include one or more wireless phones (e.g., cell phones, smartphones, etc.), personal digital assistants (PDAs), mobile computers (e.g., laptops), handheld televisions, global positioning system (GPS) devices, and/or other wireless devices. The AT 630 may provide multi-carrier or 1× functionality. The AT 630 may include a processor and memory. The AT 630 may execute a plurality of user applications that perform various functions, such as web browsing, email, etc. Each of two or more of the user applications may be executable to request connections to the AN 640. Embodiments of the invention described herein operate to provide improved handling of multiple connection requests from different applications executing on the AT 630.

The AN 640 may provide data connectivity for the AT 630 and may allow for communication between the AT 630 and another network (e.g., the Internet). In one embodiment, the AN 630 may include a high data rate (HDR) base station for providing high data rate functionality (such as Internet access) to the wireless device (AT) 630. Additionally, the AN 640 may provide data and voice communication functionality for the AT 630. In primary embodiments, the AN 640 may provide high data rate (HDR) communications for the AT 630. Thus, the AT 630 and the AN 640 may communicate during one or more HDR or high rate packet data (HRPD) sessions using negotiated or defined protocols. Thus a user using the AT 630 (e.g., a wireless phone) may perform wireless communications with the AN 640 to enable the AT 630 to perform Internet access, e.g., for web browsing, email, etc.

The wireless communication system may implement various protocols for communicating information. For example, the wireless communication system may implement CDMA wireless communication (or modifications thereof). More specifically, the wireless communication system may operate according to the Third Generation Partnership Project (3GPP) cdma2000 Multi-Carrier Requirements in Code Division Multiple Access (CDMA) NxEV-DO (Evolution Data-Only) networks and may provide HRPD services. Note that various embodiments described herein may use or describe modifications of the EV-DO standard to overcome prior art deficiencies.

Note further that the numbers and connections illustrated in FIG. 6 are exemplary only and that other ATs may be included as desired.

Figure 7:
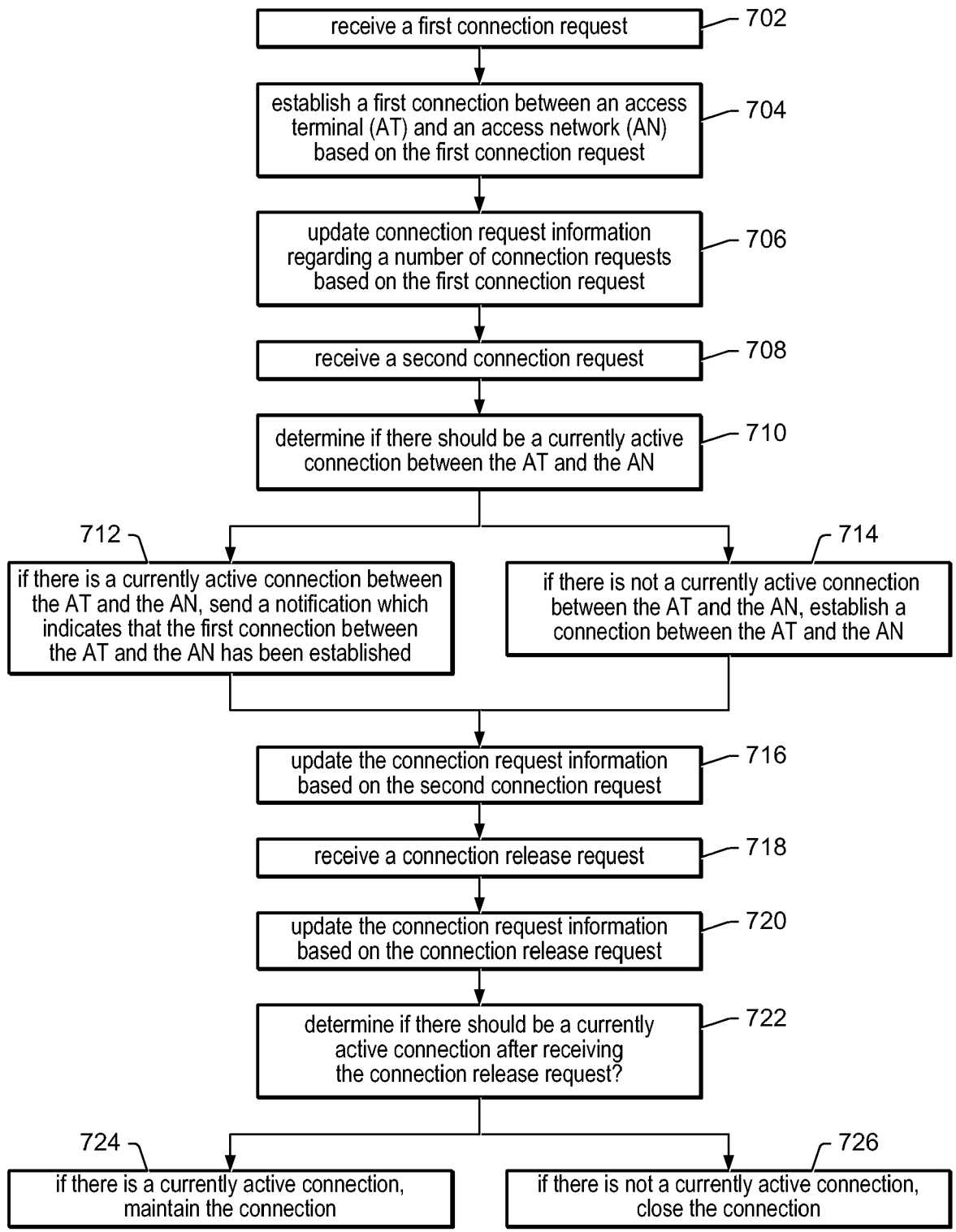
FIG. 7 is a flowchart illustrating an exemplary method for handling multiple connection requests in a wireless system according to one embodiment.

FIG. 7—Method for Handling Multiple Connection Requests in a Wireless System FIG. 7 illustrates a method for handling multiple connection requests in a wireless system. The method shown in FIG. 7 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 702, a first connection request may be received. In some embodiments, the request may be received by an Access Terminal (AT), e.g., the AT 630. For example, in one embodiment, the first connection request may be transmitted by a first application executing on the AT. As a more specific example, a user of the AT may be executing an application, e.g., for web browsing, email client, on-line games, voice over IP (VoIP), file transfer protocol (ftp), secure shell (ssh) protocol, and/or other protocols or applications such as testing applications. Alternatively, the first connection request may be transmitted by an Access Network (AN), e.g., the AN 640. For example, such an action may occur if the user is using a cell phone and receives a call. Further descriptions of AN and AT based connection requests are described below with respect to FIGS. 8-14.

In 704, a first connection (e.g., a first wireless connection) may be established between the AT and the AN. Establishing the connection may be performed in response to receiving the first connection request. Establishing the connection may be performed according to ordinary procedures including, for example, communicating handshake information, identification information, communication information, and/or other information required for establishing a connection (e.g., a wireless connection).

Additionally, in one embodiment, information may be stored indicating that the first connection is being set up prior to establishing the first connection, and second information may be stored indicating the first connection is established after establishing the first connection. As one example, storing the first information and the second information may involve setting a flag (e.g., a connection-setup-in-progress flag) to a value (e.g., on or true) indicating that the first connection is being established and then setting the flag to a value (e.g., off or false) indicating the first connection has been established. Note that this flag is exemplary only and that other information indicating the beginning or ending of the connection setup is contemplated. Thus, a first connection between the AT and the AN may be established. The first connection may then be used by the AT (e.g., the first application executing on the AT) and/or the AN.

In 706, connection request information regarding a number of connection requests may be updated. Updating the connection request information may be performed in response to receiving the first connection request. The connection request information may be any type of information used to keep track of the number of connection requests (or possibly the number of active applications using the connection). In primary embodiments, the connection request information may include a counter which increments when a new connection request is received or when a new application begins using the connection. As one example, where there is not a currently active connection, the counter may go from a first value (e.g., 0) to a second value (e.g., 1) based on receiving the first connection request. Thus, when the first connection request is received in 702, the connection request information may be updated to reflect that connection request. Updating the connection request information may be performed by the AT. However, it should be noted that other components or devices may maintain and update the connection request information as desired (e.g., the AN).

In 708, a second connection request may be received, e.g., by the AT. Similar to descriptions above regarding the first connection request, the second connection request may be transmitted from a second application executing on the AT or may be received from the AN, among other sources. Note that if the connection is still being established, the second connection request may be queued. Checking to see if the connection is still being established may be performed by checking the connection-setup-in-progress flag (or other similar information) described above in 704.

In 710, it may be determined if there is a currently active connection between the AT and the AN. Similar to above, the determination may be performed by the AT and/or other devices or components as desired. If there is a currently active connection between the AT and the AN, in 712, a response or notification may be sent which indicates that the first connection between the AT and the AN has been established. In various embodiments, the notification may be sent to the AN and/or the second application (among others). The notification may be sent to the transmitter of the second connection request. Additionally, where there is an already established connection (e.g., the first connection from above), the second application and/or the AN may use the first connection for communication. Thus, in one embodiment, a plurality of applications may use the first connection to communicate with a network (e.g., the Internet).

If there is not a currently active connection, in 714, a connection may be established as in 704. The AT (e.g., executing the second application) and/or the AN may then use the newly established connection for communication.

In 716, the connection request information may be updated. Similar to above, the connection request information may be updated before or after the determination of 710 and may be performed by the AT (or other devise or component) as desired. As also indicated above, updating the connection request information may include incrementing a counter of requests or active applications. Following the example from above, assuming the existing connection is still active and no connection release request has been received, the counter may increase from the second value (e.g., 1) to a third value (e.g., 2).

In 718, a connection release request may be received, e.g., by the AT. In various embodiments, the connection release request may be sent by the AN, the first application, the second application, the AT, and/or other sources, as desired.

In 720, the connection request information may be updated in response to the connection release request. As indicated above, the connection request information may be stored and updated by the AT or other device as desired. For example, where the connection request information includes a counter, the counter may be decremented. Following the specific example from above, the counter may be decremented from a first value (e.g., 2) to a second value (e.g., 1).

In 722, it may be determined if there should be a currently active connection after receiving the connection release request. Similar to above, the determination may be performed by the AT or other component or device as desired. Determining if there should be a currently active connection may involve use of the connection request information. For example, if the connection request information indicates that there is an application (or other process) still using the connection, then in 724, the connection may be maintained (e.g., not closed). This may be easily determined in situations where the connection information includes a counter. Following the examples from above, the counter may have been decreased from 2 to 1 after receiving the connection release request. Because the counter is greater than 0, it can be inferred that an application or other process is still using the connection. Correspondingly, the connection release request may not result in releasing the connection, but may instead only change the connection request information.

If there is not a currently active connection (other than the one being requested to be released), then, in 726, the connection between the AT and the AN may be closed. For example, following the counter embodiment from above, if the value is 0 (or possibly below 0) after updating the counter based on the release request, then the connection should be closed. Thus, a connection release request may or may not result in a closure of the connection, depending on the connection request information.

Thus, FIG. 7 illustrates an exemplary embodiment for handling connection requests in a wireless communication system. As noted above, this method may particularly apply to the EV-DO, EV, CDMA, and/or other wireless communication standards and protocols. In one embodiment, the AT and the AN may communicate and/or determine connection information using the Air Link Management Protocol (ALMP), the Idle State Protocol (IDP), the Route Update Protocol (RUP), and/or the Connected State Protocol (CSP).

Thus, the method may include centralizing connection control at the Air Link Management Protocol (ALMP) and using a connection request counter to keep track of the number of connections opened. Other protocols may remain transparent. In other words, modifications to other protocols may not be necessary. The following sections describe specific use cases for handling multiple connections using embodiments of the current invention. Note that these descriptions and Figures are exemplary only and that other use cases, variables, and procedures are envisioned.

FIG. 8—AT Initiated Connection Setup

Figure 8A:
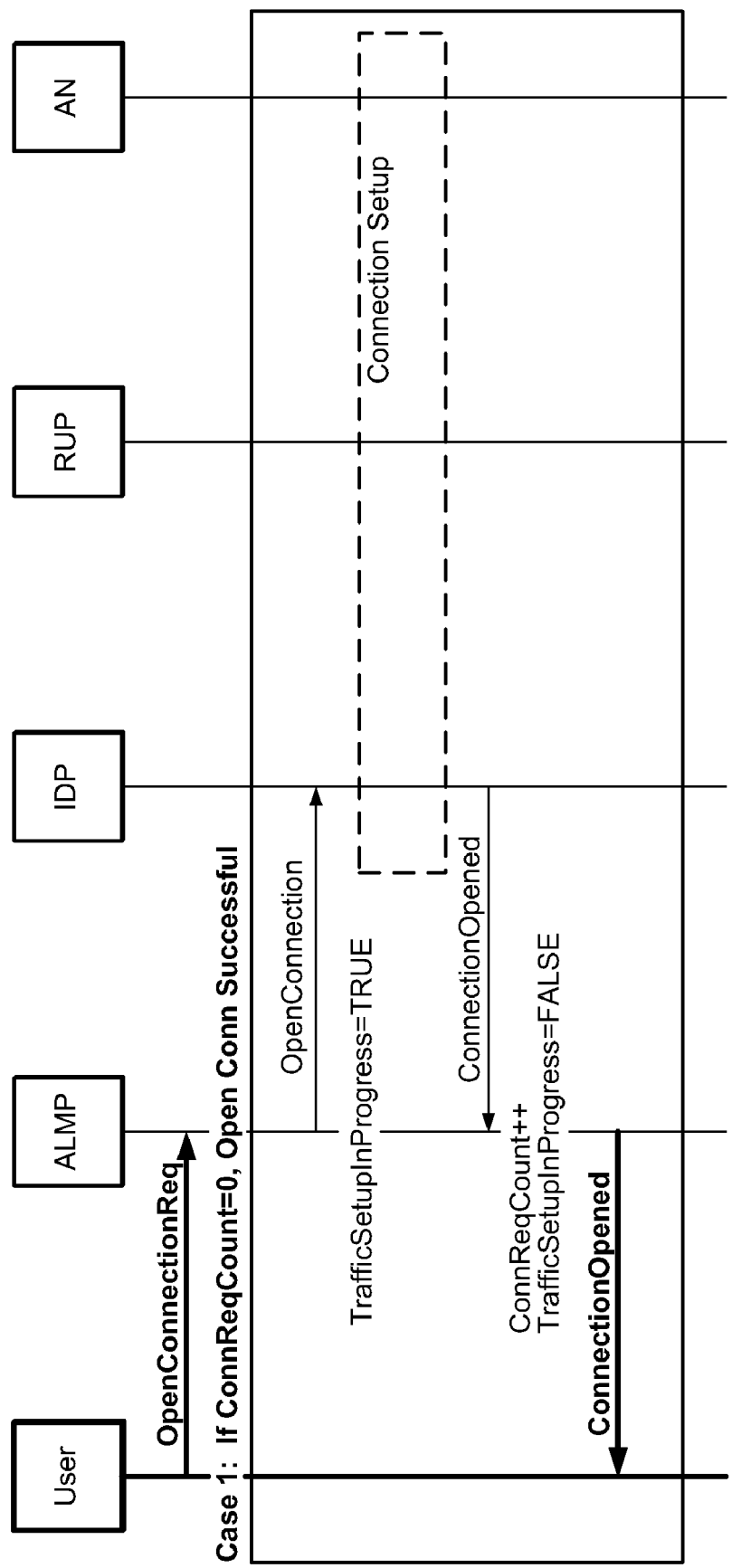
FIGS. 8-14 are exemplary diagrams illustrating various wireless connection procedures following the exemplary method of FIG. 7 according to one embodiment.
Figure 8B:
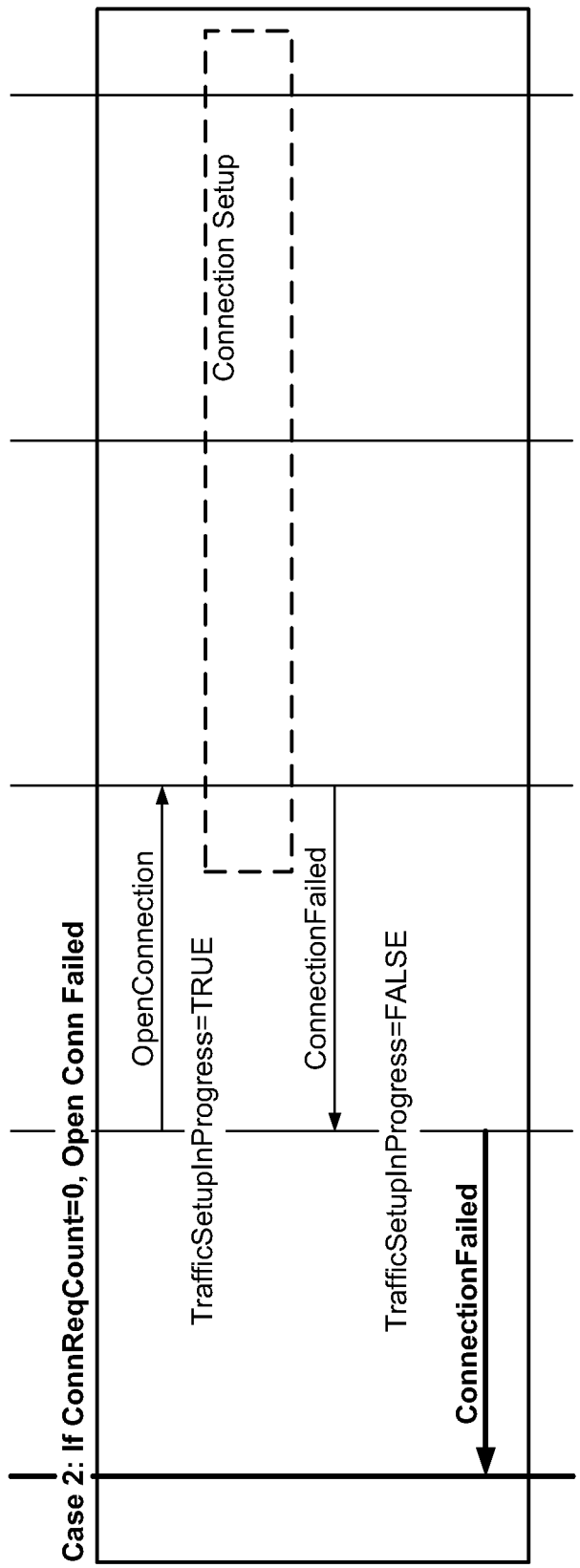
Figure 8C:
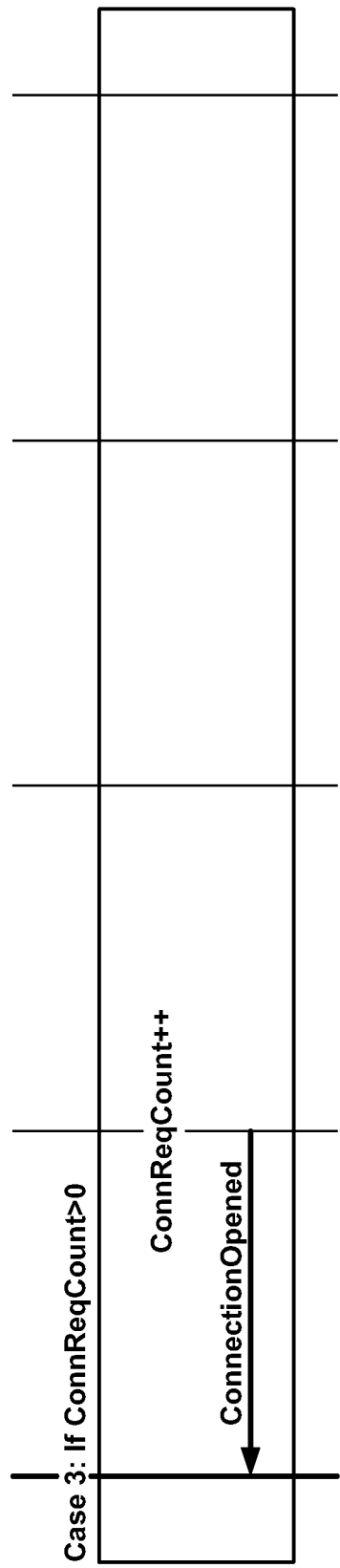

When a connection is first opened, the AT may set up a connection with the AN through connection setup messaging, and a counter, ConnReqCount, may be incremented (e.g., connection request information may be updated) after the connection is established. Subsequently, if another application requests for opening a connection, a response may be sent immediately, and the ConnReqCount may be incremented. Note that the ConnReqCount being greater than zero may imply that an existing connection is up. Additionally, a traffic setup in progress (TrafficSetupInProgress) flag (or other information) may be set when a traffic channel connection setup is in progress so that any other open connection requests from other applications may be queued. FIGS. 8A-C illustrate this exemplary use case in an embodiment of the AT utilizing three layered communication protocols, ALMP, IDP, and RDP. As shown in FIG. 8A, the flag, TrafficSetupInProgress, is set and released to mark a critical section of connection setup. After a successful connection open, the counter ConnReqCount increments. In another case shown in FIG. 8B, the counter may not incremented in response to the failure of connection setup. Once the connection is already opened, the counter may be incremented without any substantial actions for connection setup.

Figure 9:
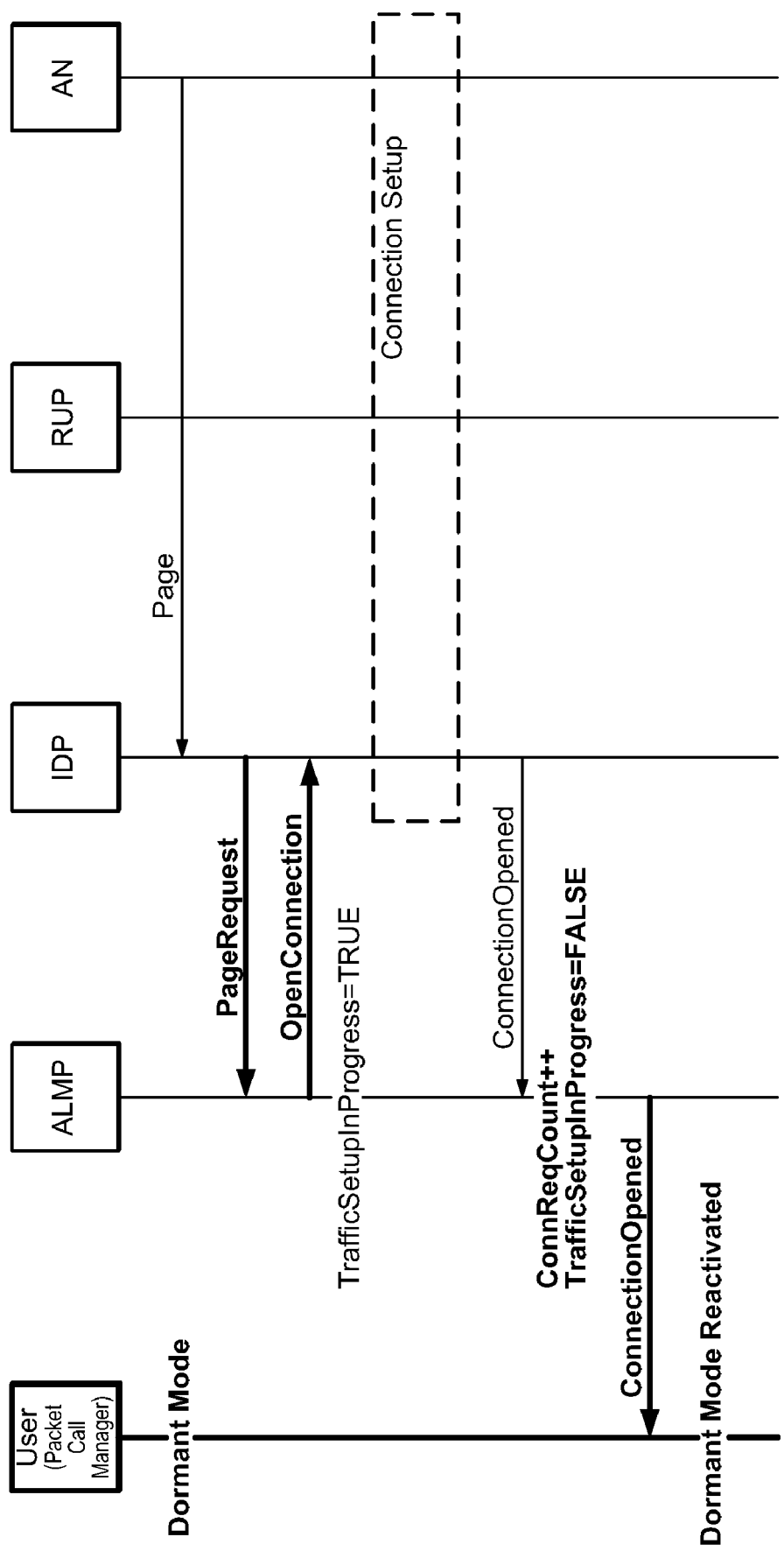

FIG. 9—AN Initiated Connection Setup

If the AN initiates the connection setup, e.g., through a page message (a Page), the ConnReqCount may be incremented after the connection is established, and the ownership of the connection may be given to the packet call manger (PCM). If the PCM is in a dormant mode, then it may be reactivated. FIG. 9 illustrates this exemplary use case.

Figure 10:
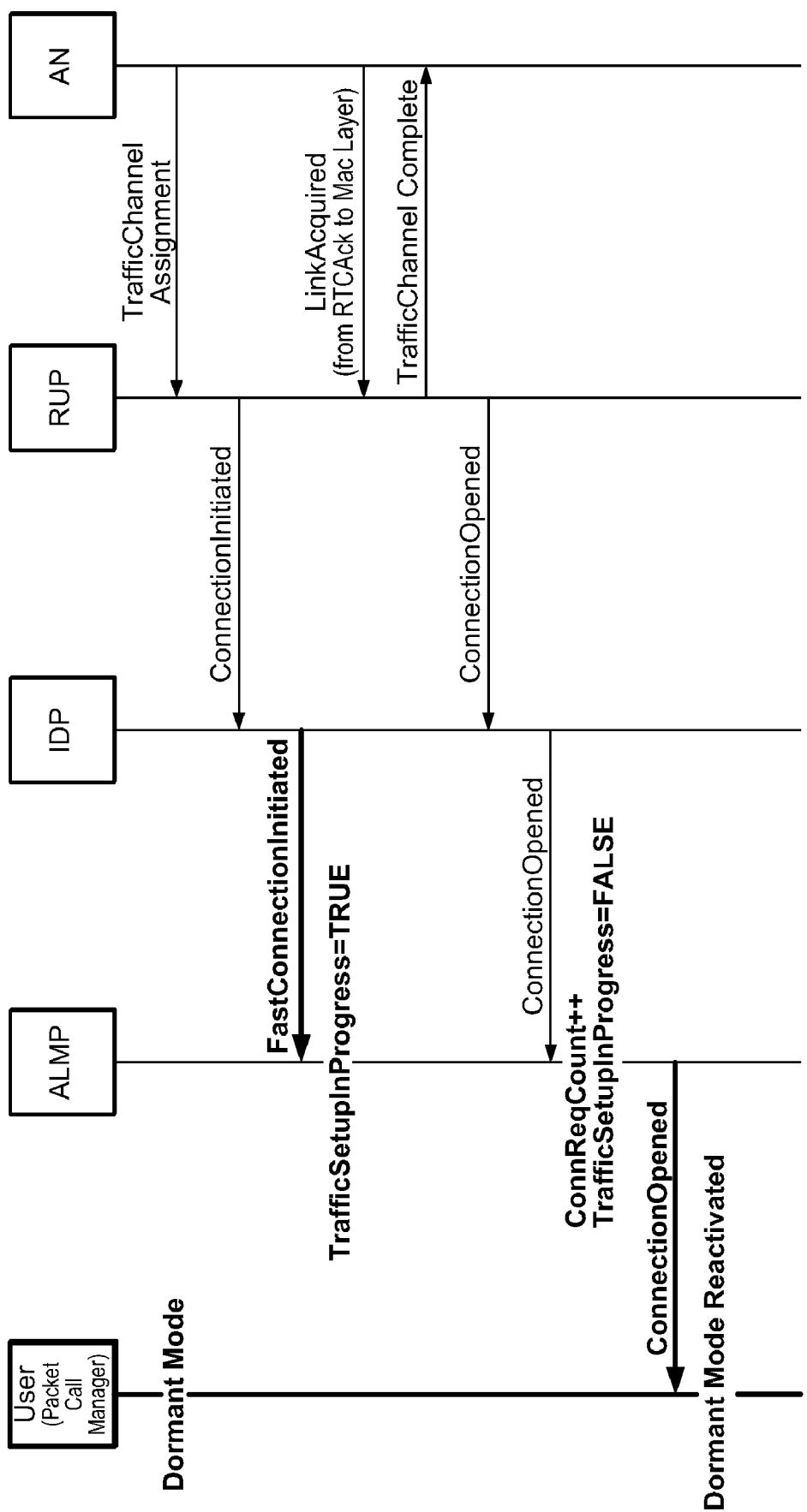

FIG. 10—AN Initiated Fast Connection Setup

If the AN initiates a fast connection setup through the traffic channel assignment message, the ConnReqCount may be incremented after the connection is established, and the ownership of the connection may be given to the PCM. Similar to above, if the PCM is in a dormant mode, it may be reactivated. FIG. 10 illustrates this exemplary use case.

FIG. 11—Open Connection Request while Connection Setup in Progress

Figure 11A:
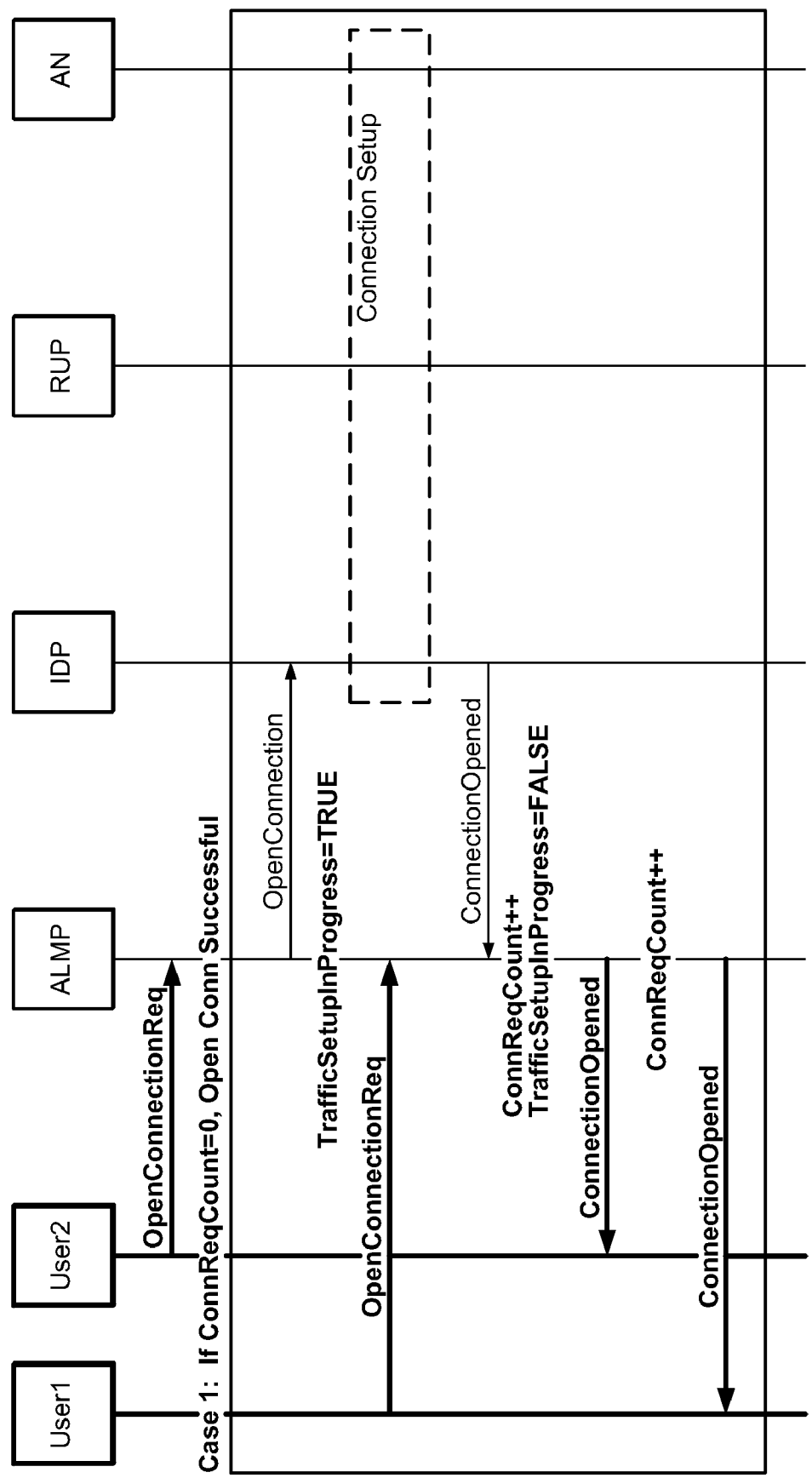
Figure 11B:
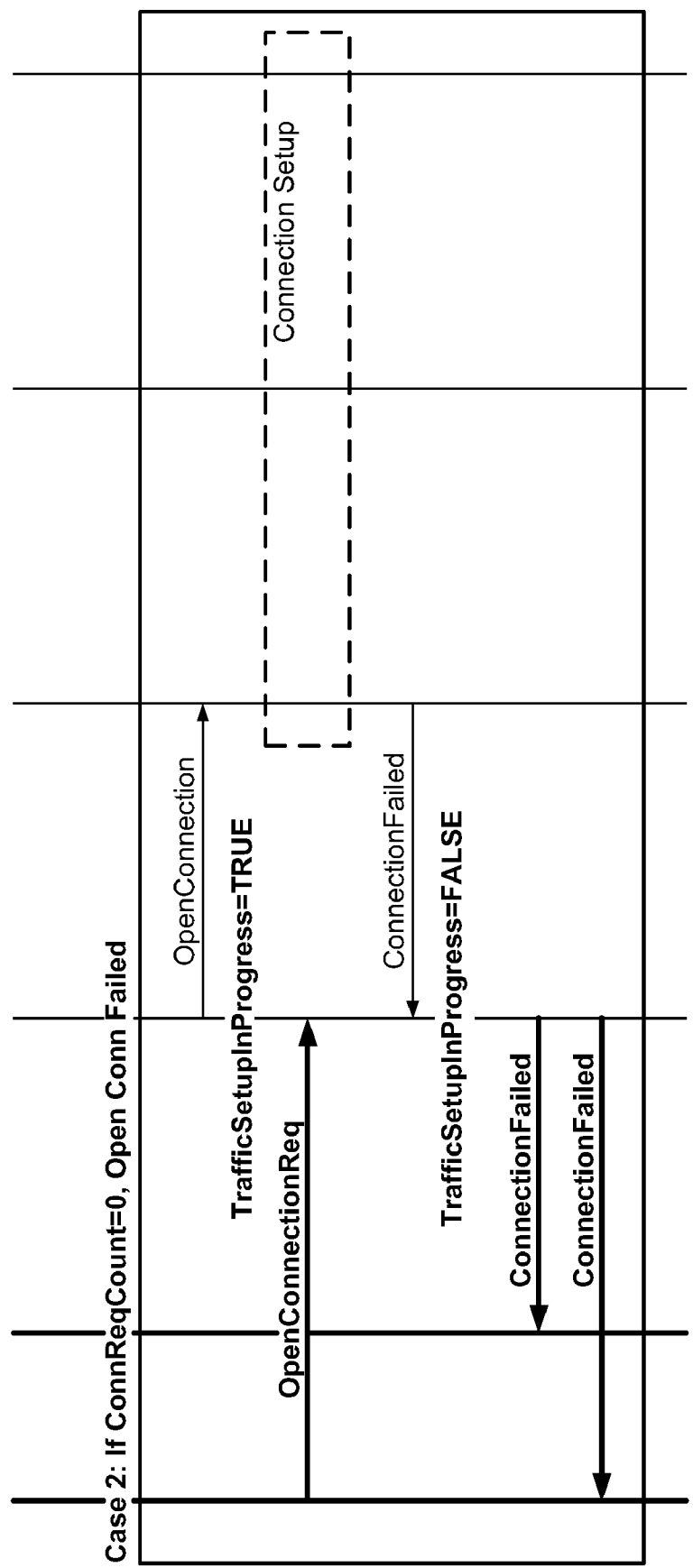

As described above, a TrafficSetupInProgress flag may be set once a traffic connection setup is in progress. In the event that another open connection request arrives from one or more other applications, the open connection requests may be queued. Once the traffic channel connection is set up, a message (e.g., a ConnectionOpen message) may be sent to all users who requested an open connection. In other words, the counter and the flag, ConnReqCount and TrafficSetupInProgress, may be shared among users and/or applications. FIGS. 11A-B illustrate this exemplary use case.

FIG. 12—Connection Release

Figure 12A:
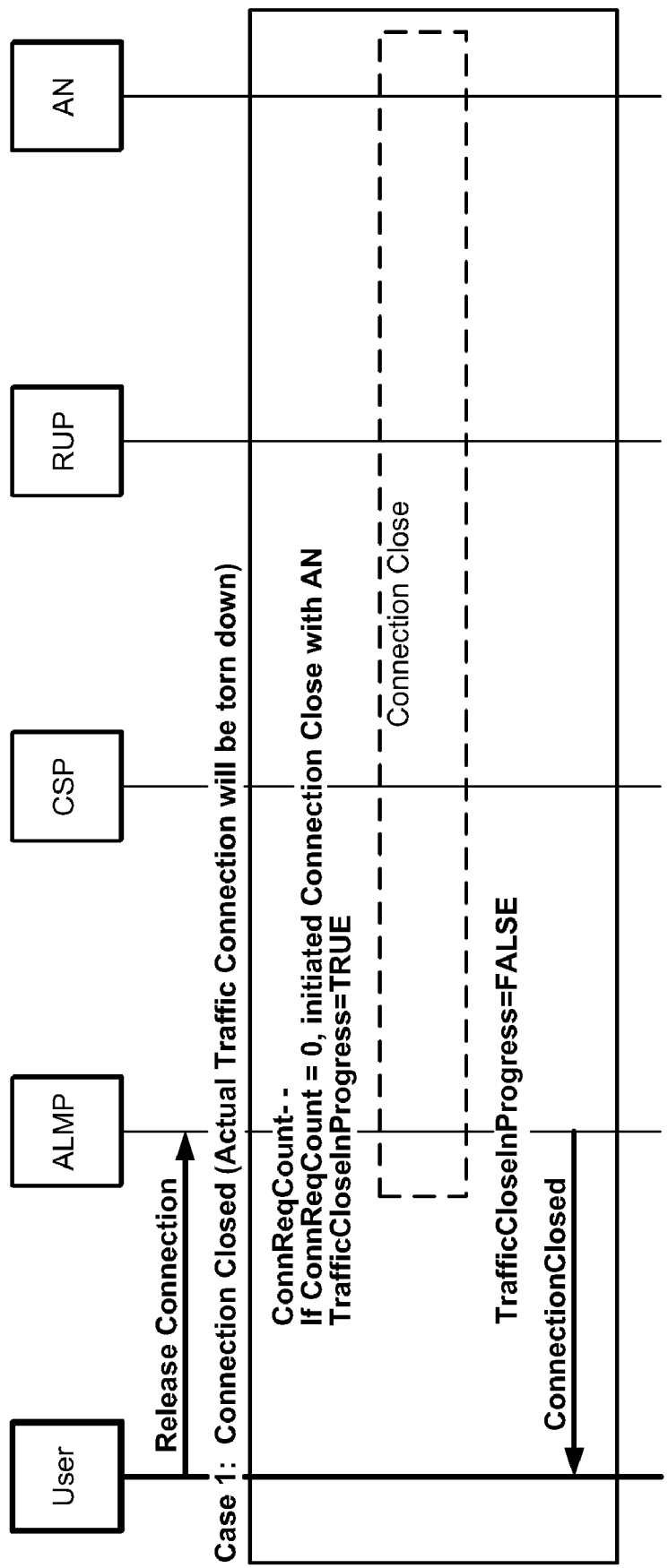
Figure 12B:
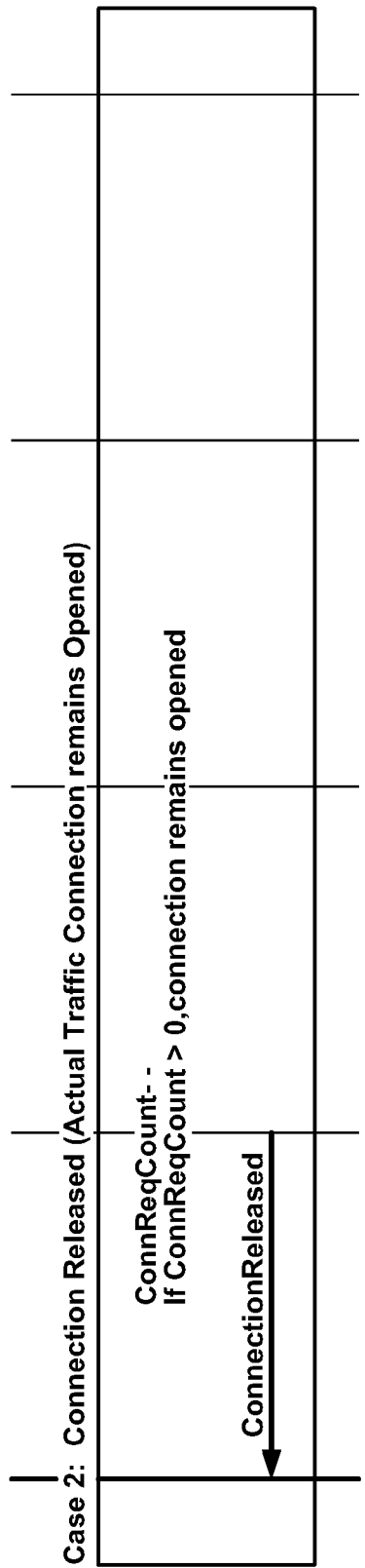

When a connection is requested to be released, a ReleaseConnection message may be sent to the ALMP. The traffic channel connection may not be closed unless the ConnReqCount is zero, implying that no other users need the connection. A ConnectionReleased message may be sent if the connection is still up, otherwise a ConnectionClosed message may be sent to indicate closure of the traffic connection. A TrafficCloseInProgress flag may be set when the connection closing is initiated to handle race conditions when other ConnectionRelease requests arrive. FIGS. 12A-B illustrate this exemplary use case.

Figure 13:
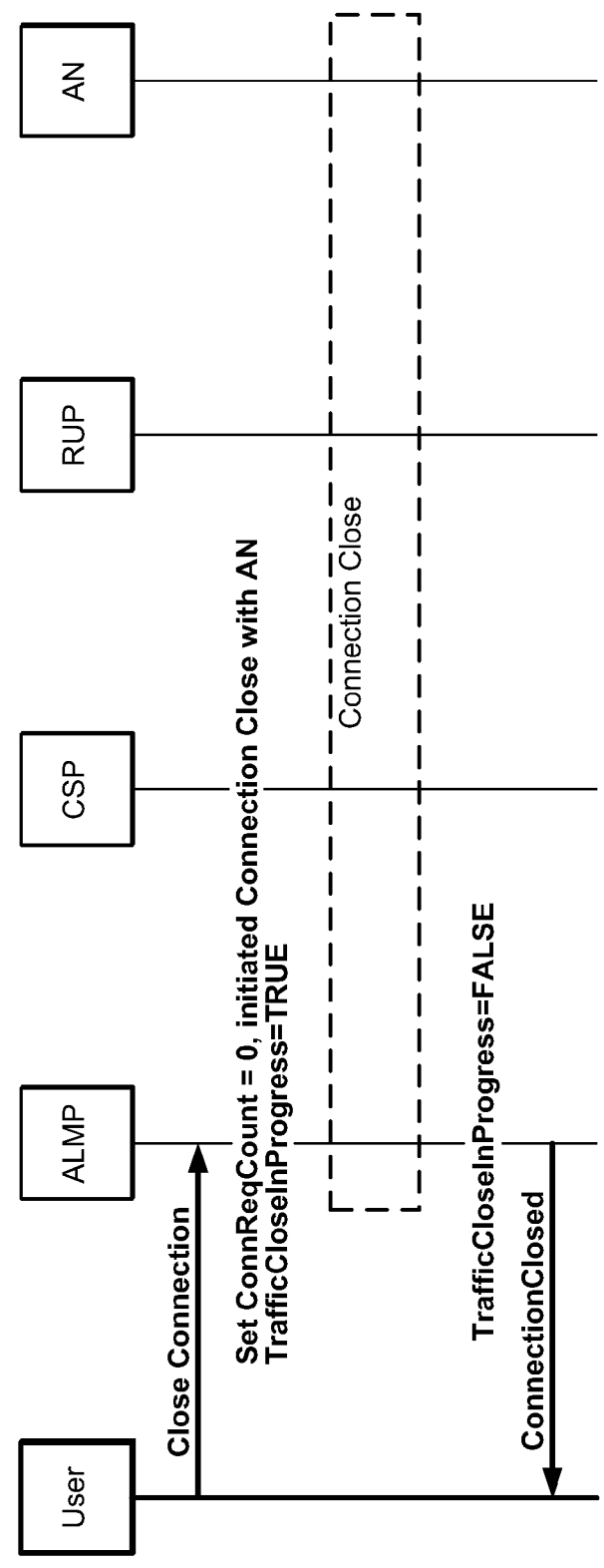

FIG. 13—Connection Close

When the traffic channel is to be closed and/or torn down (e.g., in response to users, applications, requests from other entities such as the AN, etc.), a CloseConnection message may be sent to the ALMP to initiate messaging with the AN to tear down the connection. As one example, the PCM may initiate this procedure when handing over to another technology. FIG. 13 illustrates this exemplary use case.

Figure 14:
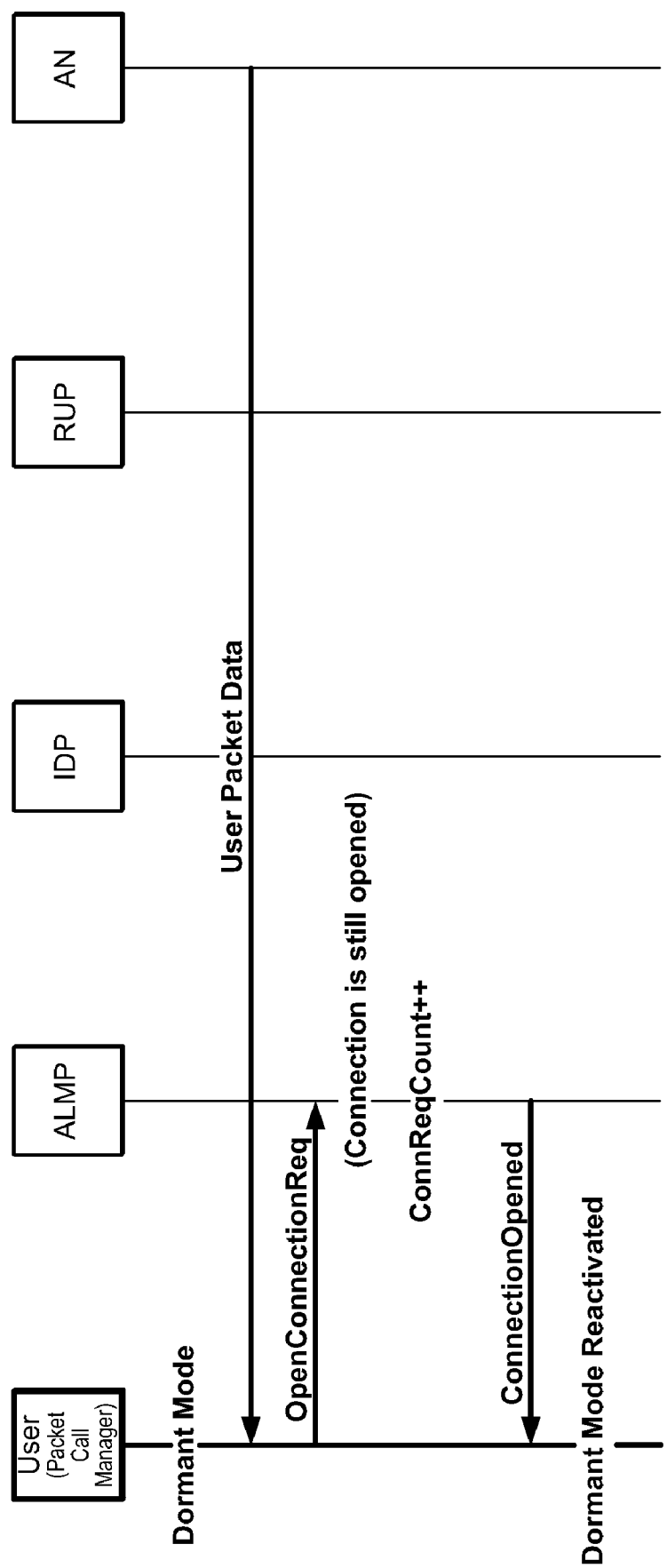

FIG. 14—Packet Call Dormant Reactivation

All packet call handling may remain transparent using embodiments of the present invention. For example, if a packet call is dormant (but the traffic connection is still open) and a data packet is received at the PCM (e.g., from the AN or the AT), the PCM may simply request an open connection using conventional prior art methods (among others). Correspondingly, because the traffic connection may be open, a ConnectionOpened message may be sent immediately to the PCM. Note that if the packet call is dormant and the traffic connection is closed, the AN may send a Page to initiate a connection setup as described above. FIG. 14 illustrates this exemplary use case.

ADVANTAGES OVER PRIOR ART

As described above, previous systems have not adequately handled multiple connections. Using embodiments of the current invention, the AT may handle multiple connection requests from different user applications executing on the AT at the same time. For example, when additional user requests for opening a connection arrives while a traffic connection setup is in progress, the additional user requests may be queued and serviced later, resulting in successful connection setups for all user applications. Additionally, the present invention allows for minimal changes to the various ones of the protocols. In some embodiments, the proposed changes are centralized in the ALMP with some possible minimal changes in the ISP. For AN-initiated call setups, the IDP may forward the requests to the ALMP, but all other AT protocols may remain transparent. Note that packet call handling as well as packet call dormant mode release and reactivation procedures may remain unchanged and may thus require no modifications for implementing the present invention. Note that while these protocols and procedures may be unaffected in primary embodiments, it is envisioned that other modifications may apply to various ones of the protocols and procedures as desired.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

The invention claimed is:

1. A method for handling connection requests between an Access Terminal (AT) coupled to an Access Network (AN), comprising:
    receiving, by the AT, a first connection request, wherein the first connection request is for a data connection between the AT and the AN;
    establishing, by the AT, a first wireless connection between the AT and the AN in response to said receiving the first connection request;
    updating, by the AT, connection request information regarding a number of connection requests based on said receiving the first connection request;
    receiving, by the AT, a second connection request, wherein the second connection request is for a data connection between the AT and the AN;
    in response to said receiving the second connection request, determining, by the AT, if there is a currently active wireless connection between the AT and the AN based on the connection request information;
    in response to determining that there is a currently active wireless connection, sending, by the AT, a notification indicating that the first wireless connection between the AT and the AN has been established;
    updating, by the AT, the connection request information based on said receiving the second connection request; and
    using, by the AT, the first wireless connection to satisfy the second connection request;
    receiving, by the AT, a connection release request;
    updating, by the AT, the connection request information based on said receiving the connection release request;
    determining, by the AT, if there should be a currently active wireless connection in response to said receiving the connection release request, wherein said determining if there is a currently active wireless connection is based on the connection request information; and
    in response to determining that there should not be a currently active wireless connection, closing, by the AT, the first wireless connection between the AT and the AN.

2. The method of claim 1, wherein the first wireless connection is not closed in response to determining that there should be a currently active connection.

3. The method of claim 1, wherein the connection request information comprises a counter value, and wherein said updating the connection request information based on said receiving the connection release request comprises decrementing the counter value.

4. The method of claim 1, wherein the connection request information comprises a counter value, wherein said updating the connection request information based on said receiving the first connection request comprises incrementing the counter value, and wherein said updating the connection request information based on said receiving the second connection request comprises incrementing the counter value.

5. The method of claim 1, wherein if said receiving the second connection request occurs during said establishing the first wireless connection between the AT and the AN, the method further comprises:
    queuing the second connection request.

6. The method of claim 1, further comprising:
    storing first information indicating that the first wireless connection between the AT and the AN is being established prior to said establishing the first wireless connection; and
    storing second information indicating that the first wireless connection between the AT and the AN is established after said establishing the first wireless connection.

7. The method of claim 6, wherein said storing the first information comprises setting a connection-setup-in-progress flag to a first value indicating that the first wireless connection between the AT and the AN is being established, and wherein said storing the second information comprises setting the connection-setup-in-progress flag to a second value indicating that the first wireless connection between the AT and the AN is not being established.

8. The method of claim 1, further comprising:
    in response to determining that there is not a currently active wireless connection, establishing a second wireless connection between the AT and the AN in response to said receiving the second connection request.

9. The method of claim 1, wherein communications between the AN and the AT are performed according to any combination of the following protocols:
- the Air Link Management Protocol (ALMP);
- the Idle State Protocol (IDP);
- the Route Update Protocol (RUP); and
- the Connected State Protocol (CSP).

10. The method of claim 1, wherein communications between the AN and the AT are performed according to the Evolution Data-Optimized (EV-DO) standard.

11. A computer-readable memory medium comprising program instructions for handling connection requests between an Access Terminal (AT) coupled to an Access Network (AN), wherein the program instructions are executable by a processor of the AT to:
- receive a first connection request, wherein the first connection request is for a data connection between the AT and the AN;
- update connection request information regarding a number of connection requests based on said receiving the first connection request;
- determine if there is a currently active wireless connection between the AT and the AN based on the connection request information, wherein the currently active wireless connection is a data connection;
- in response to determining that there is not a currently active wireless connection, establish a first wireless connection between the AT and the AN; and
- in response to determining that there is a currently active wireless connection, send a notification indicating that the first wireless connection between the AT and the AN has been established using the active wireless connection;
- receive a connection release request;
- update the connection request information based on said receiving the connection release request;
- determine if there should be a currently active wireless connection based on the connection request information; and
- in response to determining that there should not be a currently active wireless connection, close the first wireless connection between the AT and the AN, wherein the first wireless connection is not closed in response to determining that there should be a currently active wireless connection.

12. An Access Terminal (AT), coupled to an Access Network (AN), in a communication system, wherein the AT is configured to:
- receive a first connection request for establishing data communication with the AN;
- update connection request information regarding a number of communication requests based on said receiving the first connection request;
- determine if there is a currently active wireless connection between the AT and the AN based on the connection request information, wherein the currently active wireless connection is a data connection;
- in response to determining that there is not a currently active wireless connection, establish a first wireless connection between the AT and the AN;
- in response to determining that there is a currently active wireless connection, send a notification indicating that the first wireless connection between the AT and the AN has been established using the active wireless connection;
- receive a connection release request;
- update the connection request information based on said receiving the connection release request;
- determine if there should be a currently active wireless connection based on the connection request information;
- in response to determining that there should not be a currently active wireless connection, close the first wireless connection between the AT and the AN;
- wherein the first wireless connection is not closed in response to determining that there should be a currently active wireless connection.

13. The Access Terminal of claim 12, wherein communications between the AN and the AT are performed according to any combination of the following protocols:
- the Air Link Management Protocol (ALMP);
- the Idle State Protocol (IDP);
- the Route Update Protocol (RUP); and
- the Connected State Protocol (CSP).

14. The Access Terminal of claim 12, wherein communications between the AN and the AT are performed according to the Evolution Data-Optimized (EV-DO) standard.

* * * * *